Figure 1:
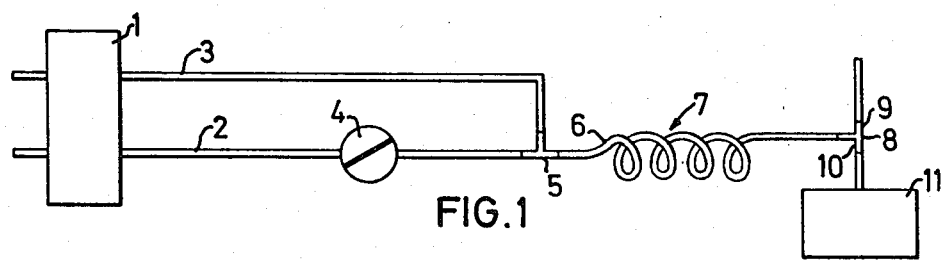

United States Patent [19]

Karlberg et al.

[11] 4,399,102

[45] Aug. 16, 1983

[54] PROCESS AND APPARATUS FOR FLOW INJECTION EXTRACTION

[75] Inventors: Bo I. Karlberg; Sidsel Thelander, both of Södertälje, Sweden

[73] Assignee: Bifok AB, Sollentuna, Sweden

[21] Appl. No.: 232,214

[22] Filed: Feb. 6, 1981

Related U.S. Application Data

[63] Continuation of Ser. No. 948,629, Oct. 3, 1978, abandoned.

[30] Foreign Application Priority Data

Oct. 3, 1977 [SE] Sweden .................. 7711016

[51] Int. Cl.³ .............................. G01N 1/14
[52] U.S. Cl. ....................... 422/82; 422/101; 422/103
[58] Field of Search .............. 422/82, 103, 81, 101; 137/583, 605, 602, 896

[56] References Cited

U.S. PATENT DOCUMENTS

| | | | | |
|---|---|---|---|---|
| 3,047,367 | 7/1962 | Kessler | | 422/82 |
| 3,695,281 | 10/1972 | Leon | | 137/602 |
| 3,699,004 | 10/1972 | Skeggs | | 422/82 |
| 3,726,297 | 4/1973 | Heimann et al. | | 137/602 |
| 3,877,310 | 4/1975 | Pecsar et al. | | 422/99 |
| 4,022,575 | 5/1977 | Hansen et al. | | 422/81 |
| 4,063,555 | 12/1977 | Ulinder | | 137/583 |
| 4,148,610 | 4/1979 | Miller et al. | | 422/81 |
| 4,212,845 | 7/1980 | Stelling et al. | | 422/101 |

Primary Examiner—William F. Smith
Attorney, Agent, or Firm—Poms, Smith, Lande & Rose

[57] ABSTRACT

A process and an apparatus for flow extraction whereby a substance dissolved in a first solvent is extracted over to a second solvent which is insoluble in the first. The two solvents are brought together via two legs in a T-tube, and the mixture exits through the third leg, the cross-sectional areas of the legs being dimensioned to produce segmented flow with alternating plugs of the second and first solvents. The ratio between the cross-sectional areas of the tube legs for the first and second solvents is 2–8:1, preferably 4:1. Between the first and third legs carrying the confluent flows, the ratio between the cross-sectional areas thereof is reduced to 0.7–1.2:1, preferably 1:1, at a distance from the juncture which is 1–3 times the inner diameter of the third leg. The confluent flow is led through a spiral hose, producing a powerful extraction due to the counter-current turbulence.

10 Claims, 2 Drawing Figures

U.S. Patent  Aug. 16, 1983  4,399,102

PROCESS AND APPARATUS FOR FLOW INJECTION EXTRACTION

This is a continuation, division of application Ser. No. 948,629, filed Oct. 3, 1978 now abandoned.

The present invention relates to an apparatus for flow injection extraction and a process for flow injection extraction.

The purpose of the present invention is to achieve the capability to make optimally sized segments of two phases which are immiscible with each other for the purpose of achieving an extraction between the phases. The segments must be large enough so that a suitable turbulence is achieved in each segment for the purpose of maximizing the extraction yield.

In analytical chemistry it is desirable to be able to analyze a large number of samples per unit of time and to be able to analyze samples in small amounts.

The most common present method for carrying out an analysis in which a number of components are included together with the component which is to be analyzed is to extract the sample manually, the extraction occurring between two mutually insoluble liquid phases and to isolate the phase containing the component to be analyzed and to analyze a sample, optionally after evaporation, spectrophotometrically for example. Such an analysis takes about 45 minutes, and it is thus easy to see that only a limited number can be performed per day. Due to the increasing number of analyses required by medical care and by production and research in the pharmaceutical industry today, it is quite evident that the above method is clearly unsatisfactory.

Substances to be analyzed in the pharmaceuticals industry include caffeine, codeine, lidocaine etc. Such substances are analyzed in production control of preparations containing them.

It has now surprisingly proved possible to perform these extractions reproducibly through the present process and apparatus. The process is characterized in that a sample containing the substance is introduced into a flow of a first solvent phase and that a second solvent phase is introduced as a liquid flow into the first liquid flow (for segmentation of the liquid flows). The inlet tube for the first liquid flow has a much larger cross-sectional area than the inlet tube for the second liquid flow, and the cross-sectional area of the outlet tube is less than the combined cross-sectional area of the inlet tubes. The confluent liquid flows are thus brought into intimate contact with each other for a period sufficiently long for extraction to take place. After separation of the two liquid phases, the substance sought can be isolated and/or quantitatively and/or qualitatively analyzed.

A preferred embodiment of the invention is characterized in that the ratio between the cross-sectional area for the first liquid flow and the cross-sectional area for the second liquid flow immediately prior to confluence is 2-8:1, preferably 4:1, and in that the ratio between the cross-sectional area for the first liquid flow and that of the confluent liquid flows is 0.7-1.2:1, preferably 1:1.

Another preferred embodiment of the invention is characterized in that the distance between the introduction of the second liquid flow into the first liquid flow and the point where the cross-sectional area is reduced is 1-3 times the diameter of the reduced cross-sectional area, when expressed as a circular area.

A further preferred embodiment of the invention is characterized in that the extraction is carried out without the introduction of gaseous segments in the liquid flows.

Another preferred embodiment of the invention is characterized in that the saple in solution is introduced in the first liquid flow as a plug in the same.

Another preferred embodiment of the invention is characterized in that the confluent liquid flow is led into a tube with a different, lower surface tension than those preceding the confluence of the liquid flows.

The apparatus according to the invention is characterized by a group of tubes (12,13,14) essentially forming a T, of which two tubes are inlet tubes (12,13) and the third is an outlet tube (14), one inlet tube (12) and the outlet tube (14) forming a straight duct, the difference between the cross-sectional areas of the inlet tubes (12,13) being very large and the outlet tube (14) essentially immediately adjacent to the juncture of the two inlet tubes (12,13) having a reduced cross-sectional area in relation to the continued cross-sectional area of the inlet tubes (12,13). Cavity 19 is formed between the forward inside edge 17 of tube 14 and the rear inside edge 21 of tube 12. The cross-sectional area of cavity 19 is greater than the cross-sectional area of either tube 12 or tube 14.

Figure 2:
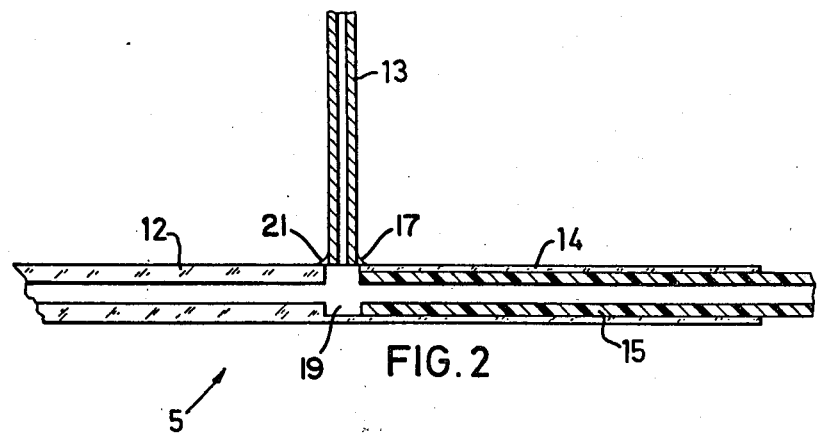

The present invention will be described below in more detail with reference to the accompanying drawing, in which FIG. 1 is a flow diagram for performing an extraction, and FIG. 2 shows in cross-section an embodiment of an apparatus according to the invention.

The description below will use caffeine as the substance to be analyzed, and water and chloroform as the phases which are immiscible with one another. The invention is not, however, limited to these components. The description here is only that of a preferred embodiment.

1 designates a rotary hose pump which is known per se. Two hoses, 2 and 3, are disposed through the pump 1. A so-called loop 4 is disposed in hose 2. The loop arrangement is designed for the introduction of a sample in a liquid flow, the sample being injected into a tube at the same time as the liquid flow is shunted past. When the sample is to be introduced into the flow, the tube with the sample is coupled in parallel with the shunt so that the liquid flow carries the sample with it. The hoses 2 and 3 are brought together in a T-tube 5, the hose 2 being coupled to the straight tube of the T-tube and the hose 3 being coupled to the perpendicular tube of the T-tube. The straight tube is also coupled preferably to a teflon hose 6 in the form of a coil 7. The teflon hose 6 leads in turn to a T-tube separator 8 (for example a Technicon T-tube A4 with separation insert). The output members 9 and 10 of the separator are connected to discharge and a spectrophotometer 11, respectively, provided with a flow-through bulb. A recording apparatus is coupled to the spectrophotometer 11 for recording UV absorption spectrums.

FIG. 2 shows the T-tube 5 in section. The T-tube is provided with two input tubes 12 and 13, tube 12 being the through-tube, and suitably made of glass. In this case the input tube 12 has a diameter of 1.1 mm. The input tube 13 consists in this case of a capillary tube of metal, melted into the glass, with an interior diameter of 0.5 mm. The through-tube finally forms an output tube 14 whose diameter is reduced within a distance of 0-3 mm from the inlet of the capillary tube 13 into the through-tube 12. The diameter of the outlet tube 14 is in this case 1 mm.

The reduction of the diameter of the outlet tube 14 by making the glass tube with this smaller diameter on, as was shown in FIG. 2, by inserting a TEFLON or other polyflourotetraethylene hose 15 into the tube 14 in such a manner that it seals tightly against the interior surface of the tube 14 and that its forward inside edge 17 lies 0–3 mm. suitably 0.5–1.5 mm, from the opening of the capillary tube 13.

The apparatus described above functions as follows: Through the hose 2 an alkaline aqueous solution is led with a flow of 0.7 ml/min., and chloroform is led through hose 3 with a flow of 1.6 ml/min. A sample containing caffeine, for example a tablet of acetyl salicylic acid dissolved in water, is introduced into the sample-introducing device 4, the so-called loop device, in a water volume of 30 $\mu$l. When the sample is introduced into the alkaline water phase which flows by means of the pump 1, it will be introduced as a plug in the water phase flow. At the same time as the water phase flows through the hose 2, the chloroform flows through the hose 3. In the apparatus 5 the aqueous phase is introduced through the tube 12 and the chloroform phase through the tube 13. Due to the reduction in cross-section in the tube 14 and the distance of this reduction from the end of the capillary tube 13, the aqueous phase is divided into segments by the inflowing chloroform phase. This means that the confluent liquid flow will consist of alternating water phase segments and chloroform phase segments. Each segment has a length of about 1–3 mm. When the segmented liquid flow passes through the spiral-shaped, approximately 2 meter long teflon hose 6, an effective extraction of caffeine from the water phase to the chloroform phase will take place. The occurrence of the extraction is due to the fact that counter-current turbulences arise in the different phase segmennts because of the different densities of the phases. When the liquid flow has passed the coil 7 it enters into a phase separator 8, whereupon the water phase is led to the discharge and the chloroform phase is led into the spectrophotometer 11, provided with a flow-through bulb. In this case the UV absorption measured was 275 nm, and the absorbence peak obtained is a measure of the quantity of caffeine present in the sample from the beginning. The repeatability is exceptionally high. In two subsequent tests with the same caffeine content the absorption maximum were identical or virtually identical ($\pm 1\%$).

It is essential in the present extraction that there be no gas phase segmentation. The chloroform phase should therefore be cooled to eliminate vaporization, and the sample must be introduced air-free.

According to the present method up to 60 samples (extractions) can be analyzed per hour.

A water-chloroform system was mentioned above, but even other systems between water and a solvent immiscible in water are conceivable, such as systems between organic solvents which are immiscible with one another.

For the sake of simplicity, only a single extraction was demonstrated above, but it is of course possible to carry out additional extractions of the chloroform phase to further eliminate and/or concentrate a substance which is to be analyzed.

The method is not only limited to quantitative analyses but can also be used for qualitative work. In the latter case, it would be suitable to carry out a number of extractions under different conditions and/or perform screenings over a larger UV absorption range.

An additional advantage of the present invention over known technology is that the volume introduced, containing the sample, can be reduced to a few microliters, whereas known technology requires several milliliters.

In the preceding description the term solvent is to be understood as including every solvent, such as water and organic solvents.

What we claim is:

1. An apparatus for combining two immiscible liquids to form a stream of alternating immiscible liquid segments of suitable size for extraction interaction while moving through a conduit, said apparatus comprising:
    a straight duct including an inlet tube portion defining a first inlet passageway having a rear edge, an outlet tube portion defining an outlet passageway having a front edge, said outlet passageway having a cross-sectional area in the range of from 0.7 to 1.2 times that of said first inlet passageway and having walls with a lower surface tension than said first inlet passageway, said straight duct further including a cavity portion located between said first inlet passageway rear edge and said outlet passageway front edge, said cavity having a cross-sectional area greater than the cross-section area of either of said first inlet passaeway or outlet passageway; and
    an inlet tube connected in flow communication to said straight duct at said cavity and substantially perpendicular to said straight duct, said inlet tube defining a second inlet passageway having an inlet opening into said cavity through which one immiscible liquid is passed for combination in said cavity with another immiscible liquid passed into said cavity through said first inlet passageway, said second inlet passageway having a cross-sectional area from $\frac{1}{2}$ to $\frac{1}{8}$ of the cross-sectional area of said first inlet passageway and said second passageway inlet opening being located along said cavity in front of said outlet passageway front edge a distance of from 1 to 3 times the diameter of said outlet passageway, wherein said immiscible liquids passing through said inlet passageways are combined to form said stream of alternating immiscible liquid segments of suitable size for extraction interaction which flows through said outlet passageway.

2. An apparatus according to claim 1 wherein said outlet passageway has a cross-sectional area about equal to the cross-sectional area of said first inlet passageway.

3. An apparatus according to claim 2 wherein said second inlet passageway cross-sectional area is about $\frac{1}{4}$ of the cross-sectional area of said first inlet passageway.

4. An apparatus according to claim 1 wherein said straight duct inlet tube portion is made from glass and said outlet portion is made from polyflourotetraethylene.

5. An apparatus according to claim 4 wherein said first inlet passageway has a diameter of about 1.1 mm and said outlet passageway has a diameter of about 1.0 mm.

6. An apparatus according to claim 1 further including a coiled outlet tube connected to said outlet passageway through which said stream of immiscible liquid segments is passed for extraction interaction.

7. An apparatus according to claim 6 including a T-tube separator connected to said coiled outlet tube for separating said immiscible liquid segments into first and second separated liquids.

8. An apparatus according to claim 7 including detector means for analyzing at least one of said separated first or second liquids.

9. An apparatus according to claim 1 further including a first reservoir containing a first liquid means for flowing said first liquid through said first inlet passageway, a second reservoir containing a second liquid, said second liquid being immiscible in said first liquid and means for flowing said second liquid through said second inlet passageway.

10. An apparatus according to claim 9 further including means for introducing well defined extractable sample slugs into said first liquid prior to or during passage of said first liquid through said first inlet passageway.

* * * * *